United States Patent
Oare et al.

(10) Patent No.: US 6,709,540 B1
(45) Date of Patent: Mar. 23, 2004

(54) COMPOSITE PLY STRUCTURE FOR TIRES AND METHOD OF MANUFACTURE

(75) Inventors: Thomas Reed Oare, Suffield, OH (US); Richard Michael D'Sidocky, Ravenna, OH (US); David Thomas Reese, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/980,144

(22) PCT Filed: Jun. 17, 1999

(86) PCT No.: PCT/US99/13743

§ 371 (c)(1),
(2), (4) Date: Nov. 20, 2001

(87) PCT Pub. No.: WO00/78563

PCT Pub. Date: Dec. 28, 2000

(51) Int. Cl.[7] .................. B60C 9/02; B60C 15/00; B29D 30/38

(52) U.S. Cl. ............... 156/133; 152/550; 152/552; 156/135

(58) Field of Search ................ 152/550, 552; 156/133, 135

(56) References Cited

U.S. PATENT DOCUMENTS

| 1,320,121 A | 10/1919 | Brucker |
| 1,667,009 A | 4/1928 | Matthias |
| 2,382,177 A | 8/1945 | Schanz |
| 2,393,541 A | 1/1946 | Kohler |
| 2,545,370 A | 3/1951 | Mittelmann |
| 2,625,981 A | 1/1953 | Wallace |
| 2,649,134 A | 8/1953 | Steinle |
| 3,386,486 A * | 6/1968 | Kovac et al. ........... 152/550 X |
| 4,684,421 A | 8/1987 | Tate |
| 4,904,319 A | 2/1990 | Divincenzo et al. |
| 5,328,532 A | 7/1994 | Azuma et al. |
| 5,645,674 A | 7/1997 | Bohm et al. |
| 5,762,740 A | 6/1998 | Benzing, II et al. |

FOREIGN PATENT DOCUMENTS

| EP | 0604984 | 7/1994 |
| FR | 2154597 | 5/1973 |
| GB | 1244050 | 8/1971 |
| WO | 9854008 | 12/1998 |

OTHER PUBLICATIONS

Patent Abstracts of Japan, vol 016, no 494 (M–1324), Oct. 13, 1992 & JP 04 182119 A (Yokohama Rubber Co Ltd), Jun. 29, 1992 abstract; figures 1,2.
Patent Abstracts of Japan, vol 1998, no 10, Aug. 31, 1998 & JP 10 128764 A (Sumitomo Rubber Ind Ltd), May 19, 1998 abstract; figures 1,2.

* cited by examiner

Primary Examiner—Adrienne C. Johnstone
(74) Attorney, Agent, or Firm—David L. King; Nancy T. Krawczyk (57) ABSTRACT

A tire (10) has a composite ply (40). The composite ply (40) has a primary ply (40A) reinforced with parallel inextensible cords (41) and a pair of ply extensions (40B) having synthetic cords (43). The method of manufacturing the tire (10) is described. The tire (10) can be made as a runflat type tire.

5 Claims, 9 Drawing Sheets

COMPOSITE PLY STRUCTURE FOR TIRES AND METHOD OF MANUFACTURE

RELATED PATENTS

This patent application relates to U.S. patent application Ser. No. 09/077,646, now U.S. Pat. No. 6,142,205.

TECHNICAL FIELD

This invention relates to tires, generally and more specifically, composite ply structures and methods of manufacturing the composite ply structure including at least one primary ply of inextensible radial extending cords, most preferably of fine diameter steel cords primarily for use in passenger pneumatic or light truck tires, including, not limited to, runflat type tires.

BACKGROUND OF THE INVENTION

The use of radial steel cords in tires is well known in the tire art. Earthmover and commercial truck tires have used steel corded tires for years.

As the use of steel cords is attempted in passenger tires some common problems of how to consistently make a ply turnup of a steel cord reinforced ply must be resolved.

Historically one must first ask the question of whether or not a ply turnup is even needed.

In 1921, Charles Miller in U.S. Pat. No. 1,393,952 taught that plies could be securely anchored to the beads by means of fabric strips having crossed strands relative to the ply cords without any of the plies actually wrapping around the bead core. Miller's tires showed that as few as four plies were possible, a breakthrough for the tires of that era.

In 1942, S. M. Elliott in U.S. Pat. No. 2,430,560 reported that farm tires could be made with greater elastic deformation if the bead wrapping fabric strips did not even contact the body plies. A radical departure from what was otherwise accepted practice.

In 1968, Fred Kovac and Grover Rye of The Goodyear Tire & Rubber Company patented a bias tire leaving an outer ply having giant cords of 0.037 inches or greater. This outer ply comprised two parts, a bias body ply and a pair of radial bead plies. The edges of the bead plies overlapped the edges of the body plies and are sandwiched between them. Kovac, et al indicated that the body ply may be of wire and the bead plies may be reinforced with fabric or filament. Kovac pointedly notes that if giant cords are used in the carcass, the plies containing them are so stiff that it is difficult for the tire builder to turn them around the beads. Thus, he recommended that the edges of the stiffer plies stop short of turning under the beads and bead plies of softer fabric are turned under the beads with their edges overlapping the edges of the stiffer plies.

Powers, et al of The Firestone Tire & Rubber Company taught a radial ply pneumatic tire having one or more body plies containing radially directed inextensible cords with the ply ends terminating on the same side of the bead bundle as the ply. The tire further had a bead connector ply containing radial, inextensible reinforcing cords which is wrapped about the bead bundle. Powers, et al noted that a prior art British Patent No. 990,524 disclosed a radial ply body and a radial ply bead wrap, the cords of the body ply being rayon cords and the bead wrap being steel cord reinforced. Powers noted that the differences in modulus resulted in the cords not acting together as if they were one ply, whereas his all-inextensible cord design did act as one ply. Powers taught that the body ply and the bead connecting ply, where they are contiguous to one another, must be at least 20% and not greater than 50% of the peripheral distance of the body ply as measured from the midpoint of the bead bundle along the body ply to the point on the body ply where the edges of the tread ply are located. Powers suggest glass, steel or Kevlar™ cords could be used. The Powers, et al test tire was a 11–22.5 truck tire employing 1×4+6×4×0.175+1×0.15 radial cords of steel wire of a cable construction having 14 ends per inch. Similarly, the bead connector used the same steel wire construction. These truck tires carry a high operating inflation pressure of about 100 psi and the Powers et al patent demonstrated a potentially feasible concept although no known commercialization of such a truck tire had occurred.

In 1995, Ahmad, et al disclosed a pneumatic tire having a discontinuous outer carcass ply. Ahmad, et al disclosed a full radially inner ply with a conventional turnup end and a discontinuous outer carcass ply that extended from under the belt edges to the bead, the outer ply being contiguously in contact with the outer ply.

EPO Publication 822195A2 discloses a Runflat Tire and Method which shows a runflat tire having multiple radial plies wherein at least one ply is wrapped about the bead and has a turnup, the remaining plies simply terminate near the bead. The bead area concept appears similar to the prior art solutions disclosed in Ahmad with the exception that the plies are spaced by fillers or inserts, a common feature of runflat tires.

In patent publication WO98/54008 a composite ply structure comprising the features of the preamble of claim 1 is disclosed and is considered to be the most relevant state of the art.

In U.S. Pat. No. 2,625,981, issued on Jan. 20, 1953, to E. H. Wallace, a method of making a pneumatic tire containing stranded reinforcing elements has the steps of anchoring firmly the reinforcing elements and stretching the elements and maintaining them in a stretched condition while completing the vulcanization of the tire.

The present invention provides a novel way of creating a composite ply structure in a tire. The tire can be a radial ply pneumatic tire including the type known as runflat tires.

SUMMARY OF INVENTION

A composite ply structure 40 as an intermediate article of manufacture is disclosed. The composite ply structure 40 is for use as a carcass ply for a tire 10.

The composite ply structure 40 has a primary ply 40A reinforced by cords 41, the cords 41 being encapsulated in unvulcanized rubber 44, and a pair of ply extensions 40B reinforced by flexible cords 43, the flexible cords 43 being encapsulated in unvulcanized rubber 44.

The ply extensions 40B each have an end 33 overlappingly joined to the primary ply 40A along the longitudinal length of the primary ply 40A One ply extension 40B is joined at a first end 75 of the primary ply 40A and the other ply extension 40B is joined at a second end 76 of the primary ply 40A.

The composite ply 40 has a joint interface 70 between the overlapping ply extensions 40B and the primary pay 40A. The joint interface 70 is at least surface precured sufficient to prevent slippage of the ply extensions 40B relative to the primary ply 40A during subsequent shaping and curing of the carcass. Preferably, the overlapping joint interface 70 has at least one centimeter of width.

The primary ply 40A has the cords 41 oriented radially in the range of 65° to 90° relative to the ply length; whereas, the ply extensions 40B can be oriented in the radial ply range of 65° to 90° or alternatively can be oriented in a bias ply range of 35° to 65° relative the ply length.

The method of preforming a composite ply 40 has the steps of cutting to a predetermined width a primary ply 40A reinforced with parallel cords 41 encapsulated in unvulcanized rubber 44, the width extending between a first end 75 and a second end 76; applying a pair of ply extensions 40B of predetermined widths ($W_B$), one ply extension 40B being overlappingly joined to each first and second ends 75, 76, each ply extension 40B being reinforced with parallel cords 43 encapsulated in unvulcanized rubber 44; precuring the overlappingly-joined ply extension 40B to the primary ply locally along the adjoining overlapping joint interface 70 surfaces, thereby forming a composite ply 40 having a predetermined total width ($W_T$), the composite ply 40 being unvulcanized except at the overlapping joints 70 between the ends 75 or 76 of the primary ply 40A and the ends 33 of the ply extensions 40B.

The preferred method includes the steps of induction precuring the joint 70 along the mating surfaces by activating an induction heat coil creating an energy field locally thereby rapidly heating the cords 41 which are preferably metallic in the area of the joint interface 70.

Alternatively, the method may include the steps of applying an adhesive coating 80 to the adjoining overlapping surfaces prior to curing the joint; wherein the adhesive coating 80 has induction heat sensitive material 82 and; wherein activation of an induction field of energy along the overlapping joints 70 thereby heats the adhesive after a predetermined time sufficient to at least surface precure the joints 70. This method may further include the step of applying a force to the induction-heated joints to stitch the joints 70. This method is considered less desirable than a direct induction curing without solvents, adhesives or other bonding materials, however, when no metallic cords are used, it is possible the use of a solvent becomes more desirable.

DEFINITIONS

"Aspect Ratio" means the ratio of its section height to its section width. "Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls, when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE INVENTION

Figure 1:
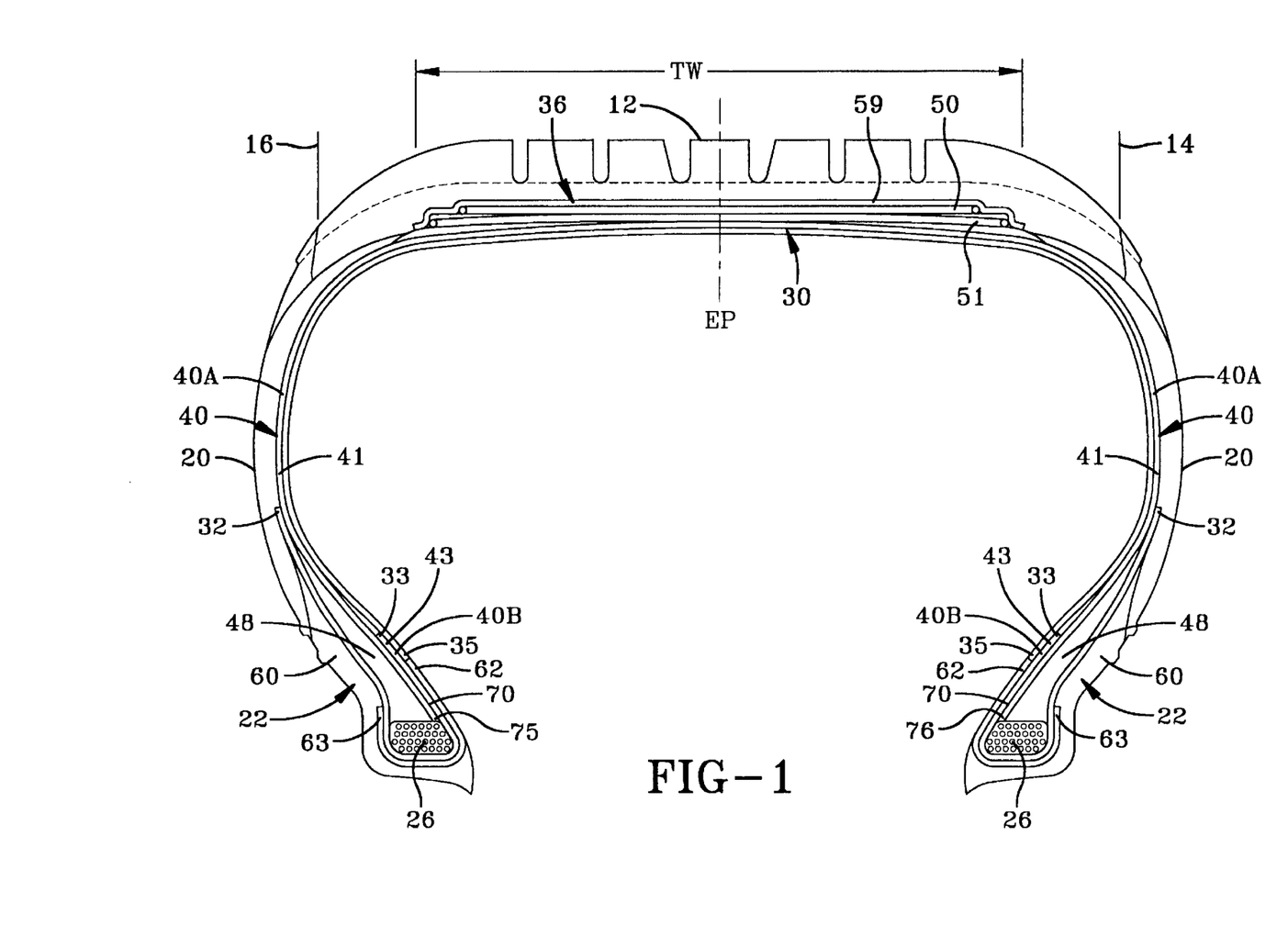
FIG. 1 is a cross-sectional view of the tire according to the invention.
Figure 2:
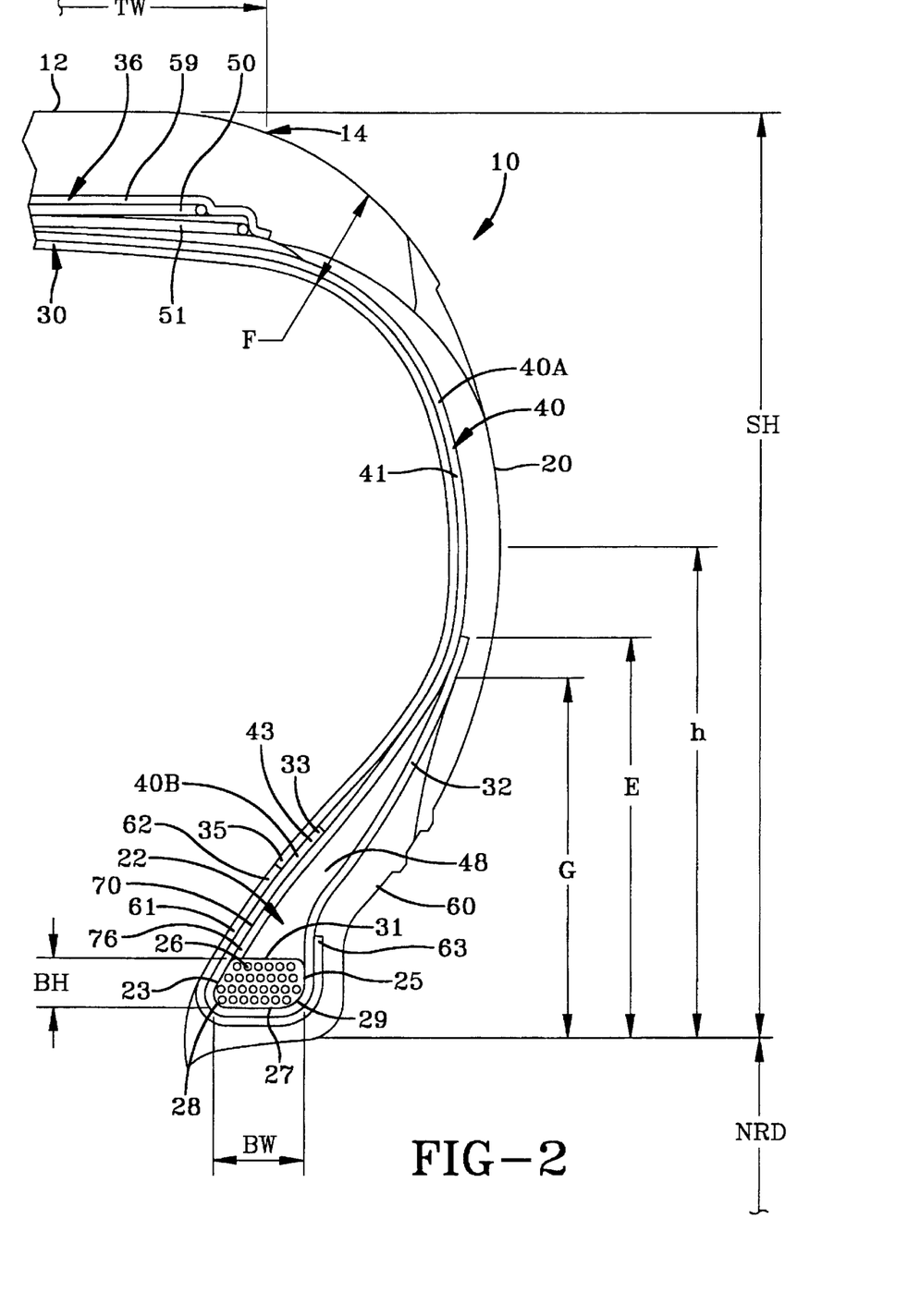
FIG. 2 is an enlarged fragmentary view of one sidewall portion of the tire of FIG. 1.

The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative construction in which the inventive concept can be practiced. The tire 10 according to the present invention employs a unique sidewall structure 20. The tires 10, as illustrated in FIGS. 1 and 2, are radial passenger or light truck tires; the tires 10 are provided with a grounding contacting tread portion 12 which terminates in the shoulder portions at the lateral edges 14, 16 of the tread 12 respectively. A pair of sidewall portions 20 extend from the lateral edges 14, 16, respectively, and terminates in a pair of bead portions 22, each having an annular inextensible bead core 26 respectively. The tire 10 is further provided with a carcass reinforcing structure 30 which extends from the bead portion 22 through one sidewall portion 20, tread portion 12, the opposite sidewall portion 20 to bead portion 22. The carcass structure 30 has at least one composite ply structure 40 having turnup ends 32 wrapped about the bead cores 26 respectively. The tire 10 may include a conventional innerliner 35 forming the innerperipheral surface of the tire 10 if the tire is to be of the tubeless type. Placed circumferentially about the radially outer surface of the carcass reinforcing structure 30 beneath the tread portion 12 is a tread reinforcing belt structure 36. In the particular embodiment illustrated, belt structure 36 comprises two cut belt plies 50, 51 and the cords of the belt plies 50, 51 are oriented at an angle of about 23° with respect to the mid-circumferential centerplane of the tire. The cords of the belt ply 50 are disposed in an opposite direction relative to the mid-circumferential centerplane and from that of the cords of belt ply 51. However, the belt structure 36 may comprise any number of belt plies of any desired configuration and the cords may be disposed at any desired angle. The belt structure 36 provides lateral stiffness across the belt width so as to minimize lifting of the tread from the road surface during operation of the tire in the uninflated state. In the embodiments illustrated, this is accomplished by making the cords of the belt plies 50, 51 of preferably steel and more preferably of a steel cable construction.

The carcass reinforcing structure 30 of the preferred embodiment tire 10 as shown in FIG. 1 comprises at least one composite ply structure 40. The at least one composite ply structure 40 has one primary ply 40A extending from bead portion 22 to bead portion 22. The primary ply preferably has one layer of parallel cords 41; the cords 41 of the primary ply are oriented at an angle of at least 75° with respect to the mid-circumferential centerplane of the tire. Overlapping and joined to the primary ply 40A is a ply extension 40B having cords 43. The cords 43 of the ply extension 40B are oriented at an angle of at least 75° with respect to the mid-circumferential centerplane of the tire. In the particular embodiment illustrated, the cords 41, 43 are oriented at an angle of about 90° with respect to the mid-circumferential centerplane. The cords 41 of the primary ply 40A of the at least one composite ply structure 40 are preferably made of an inextensible material such as steel, Kevlar™ or glass. Whereas, the cords 43 may be made of any material normally used for cord reinforcement of rubber articles, for example and not by way of limitation, aramid, rayon, nylon, and polyester.

The primary ply 40A has cords 41 that are preferably substantially inextensible, the cords are synthetic or metal, more preferably metal, most preferably steel of high tensile strength. The cords 41 have modulus X. In the case of steel cords 41, the modulus is greater than 150 GPa. One way of achieving such strength is by merging the proper process and alloys as disclosed in U.S. Pat. Nos. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

C 07 to 1.0
Mn 0.30 to 0.05
Si 0.10 to 0.3
Cr 0 to 0.4
V 0 to 0.1
Cu 0 to 0.5
Ni 0 to 0.5
Co 0 to 0.1 the balance being iron and residuals

The resulting rod is then drawn to the appropriate tensile strength.

The cords 41 for use in the non-runflat tire carcass 30 of FIGS. 1 and 2 may comprise from one (monofilament) to multiple filaments. The number of total filaments in the cord 41 may range from 1 to 13. Preferably, the number of filaments per cord ranges from 6 to 7. The individual diameter (D) of each filament generally ranges from 0.10 to 0.30 mm, for each filament having at least a tensile strength of 2000 MPa to 5000 MPa, preferably at least 3000 Mpa.

Another critical property of the steel cord 41 is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0 percent.

The torsion values for the steel for the filament used in the cord should be at least 20 turns with a gauge length of 200 times the diameter of the wire. Generally, the torsion value ranges from about 20 to about 100 turns. Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord 41 constructions for use in the primary ply 40A. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1,the outer wrap filament may have a tensile strength of 2500 MPa or greater based on a filament diameter of 0.15 mm. The most preferred cord constructions including filament diameters are 3×0.18, 1+5×0.18, 1+6×0.18, 2+7×0.18, 2+7×0.18×1×0.15, 3+9×0.18+1×0.15, 3+9×0.18, 3×0.20+9×0.18 and 3×0.20+9×0.18+1×0.15. The above cord designations are understandable to those skilled in the art. For example, designation such as 2×, 3×, 4×, and 5×mean a bunch of filaments; ie, two filaments, three filaments, four filaments and the like. Designation such a 1+2 and 1+4 indicate, for example, a single filament wrapped by two or four filaments.

The primary ply 40A has a layer of the above described steel cords arranges so as to have from about 5 to about 100 ends per inch (≈2 to 39 ends per cm) when measured at the equatorial plane of the tire. Preferably, the layer of cords are arranged so as to have about 7 to about 60 ends per inch (≈2.7 to 24 ends per cm) at the equatorial plane. The above calculations for ends per inch are based upon the range of diameters for the cord, strength of the cord and the practical strength requirement for the ply. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords 41 of the composite ply 40 are oriented such that the tire 10 according to the present invention is what is commonly referred to as a radial.

The steel cord of the ply intersect the equatorial plane (EP) of the tire at an angle in the range of from 75° to 105°. Preferably, the steel cords intersect at an angle of from 82° to 98°. The preferred range is from 89° to 91°.

The composite ply 40 has a plurality of fine diameter cords 41 with the cord diameter (C) less than 1.2 mm. The cord 41 can be any of the before mentioned cords including but not limited to 1+5×0.18 mm or 3×0.18 mm or a monofilament wire having a diameter of about 0.25 mm, preferably 0.175 mm. It is considered desirable that these cords 41 have filaments having a minimum tensile strength of at least 2500 MPa and over 2.0 percent elongation, preferably about 4000 MPa and over 2.5 percent elongation.

As further illustrated in FIG. 2, the at least one composite ply structure 40 has a pair of ply extensions 40B, each having a radially inner end 33 and a turnup end 32 respectively, which wraps about the bead core 26. The ply extension 40B are in proximity to the bead core 26 and terminate radially above and axially inward of the bead core 26 with the end 33 overlappingly engaging the terminal ends 75, 76 of the primary ply 40A. In the preferred embodiment, the axially outer turnup ends 32 are located within 20% of the section height (SH) of the tire from the radial location (h) of the maximum section width, most preferably terminating at the radial location (h) of the maximum section width. As shown the turnup ends 32 terminate radially a distance (E) above the nominal rim diameter of the tire in proximity to the radial location (h) of the maximum section width of the tire. As further illustrated in FIGS. 1 and 2, the bead portions 22 of the tire 10 each have an annular substantially inextensible bead core 26. The bead cores each have a flat base surface 27 defined by an imaginary surface tangent to the radially innermost surface of the bead wires. The flat base surface 27 has a pair of edges 28, 29, and a width "BW" between the edges. Preferably the bead core 26 may further include a flat radially outer surface 31 extending between first and second surfaces 23, 25 respectively. The radially outer surface 31 has a maximum height (OH), the height (BH) is less than the width of the base (DW). The cross-section defined by the surfaces 23, 25, 27 and 31 preferably are in the form of a substantially rectangular or trapezoidal cross-section.

The bead cores preferably are constructed of a single or monofilament steel wire continuously wrapped. In a preferred embodiment, 0.050 inch diameter are wires wrapped in layers radially inner to radially outer of 7, 8, 7, 6 wires, respectively. The flat base surfaces of the bead cores 26 are preferably inclined relative to the axis of rotation, and the bottom of the multi-portion of the bead is similarly inclined, the preferred inclination being about 10° relative to the axis of rotation preferably about 10.5°. This inclination of the bead base assists in sealing the tire and is about twice the inclination of the bead seat flange of a conventional rim and is believed to facilitate assembly and assists in retaining the beads seated to the rim.

Located within the bead region 22 and the radially inner portion of the sidewall portions 20 are high modulus elastomeric apex fillers 48 disposed between the carcass reinforcing structure 30 and the turnup ends 32 respectively. The elastomeric fillers 48 extend from the radially outer portion of the bead cores 26 respectively, up into the sidewall portion gradually decreasing in cross-sectional width. The elastomeric fillers 48 terminate at a radially outer end at a distance (G) from the nominal rim diameter (NRD) of at least 25% of the section height (SH) of the tire.

In a preferred embodiment of the invention, the ply extensions 40B have parallel radially extending cords 43. Alternatively, the ply extensions 40B could have cords 43 oriented at a bias angle relative to the radial direction. The amount of and direction of orientation could range at an included angle relative to the radial direction in the range from 25° to 75°, preferably 45° or less. It is believed the cord reinforcement of the ply extension 40B utilizing bias angled cords can be used to improve the handling characteristics of the tire when the tire is uninflated.

Figure 3:
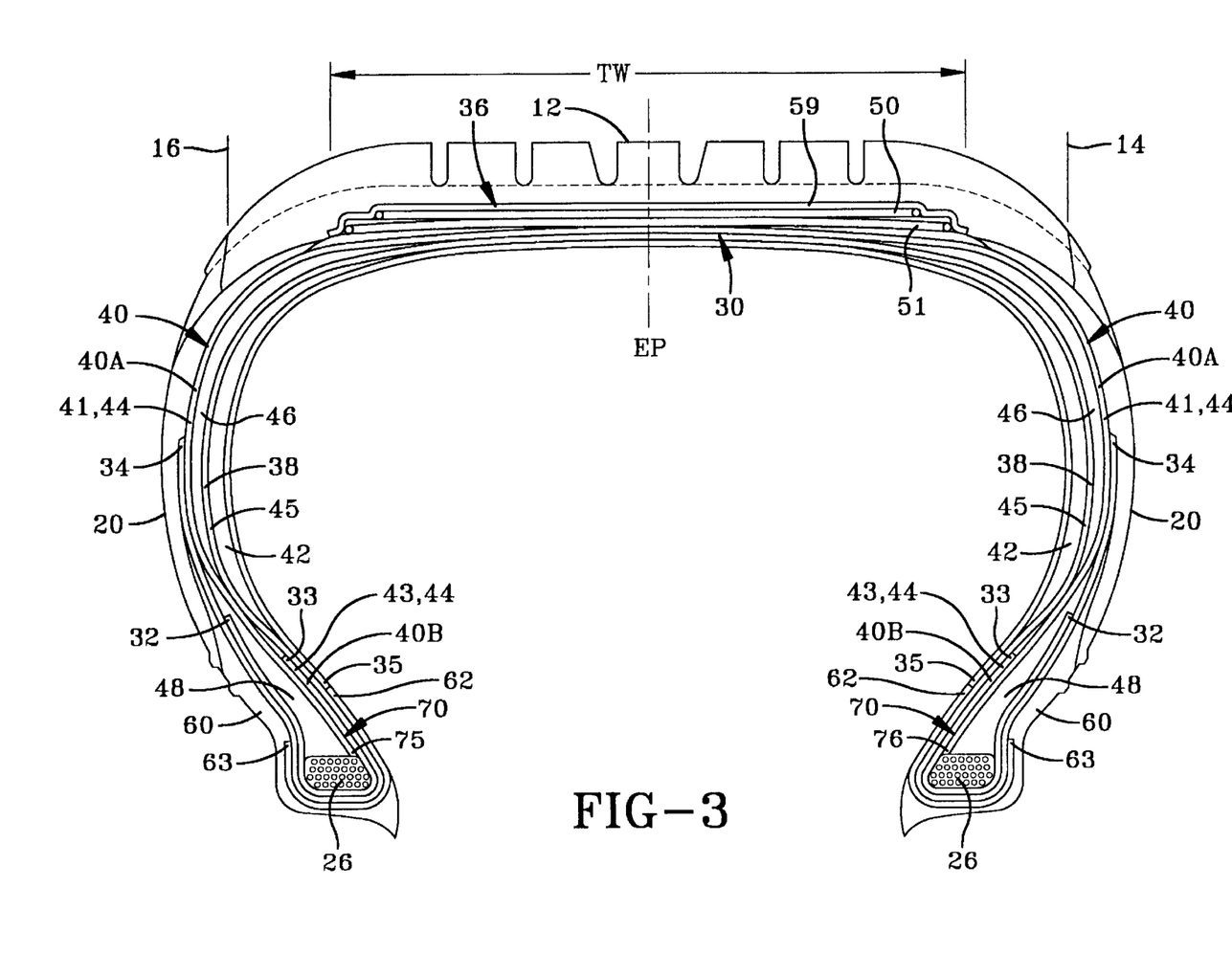
FIG. 3 is a cross-sectional view of an alternative embodiment tire according to the invention, the tire being a runflat tire.
Figure 4:
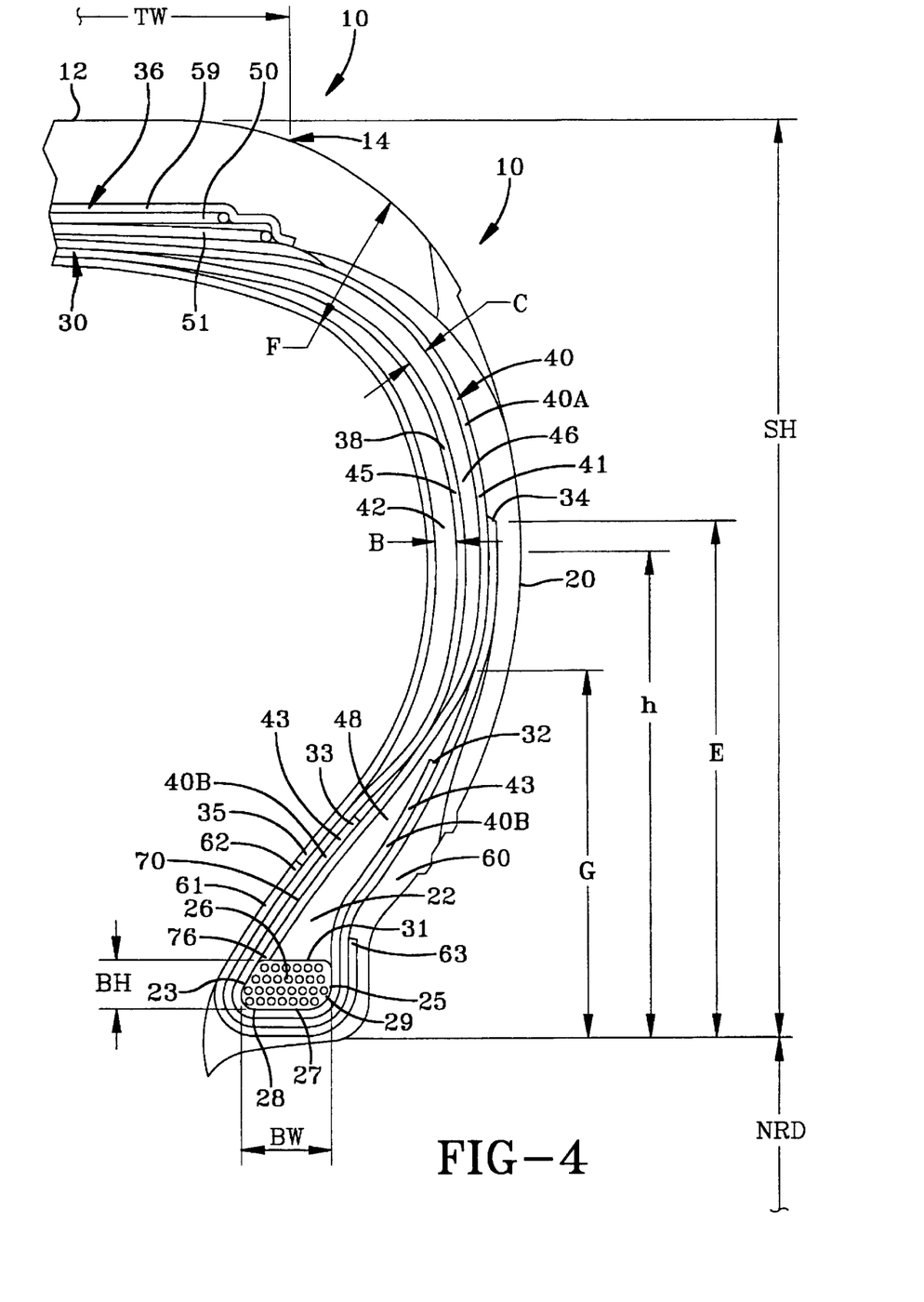
FIG. 4 is an enlarged fragmentary view of the sidewall portion of the tire of FIG. 3.

With reference to FIGS. 3 and 4, the carcass reinforcing structure 30 of the preferred embodiment runflat tire 10 as shown in FIG. 3 comprises at least two reinforcing ply structures 38, 40. In the particular embodiment illustrated there is provided a radially inner ply reinforcing structure 38 and a radially outer composite ply reinforcing structure 40, each ply structure 38, 40 preferably has one layer of parallel cords extending radially from bead portion 22 to bead portion 22. The second ply reinforcing structure 38 wraps around the composite ply structure 40 and has a turnup end 34 extending radially outwardly. The second ply structure 38 preferably has synthetic cords 45 of nylon or rayon, aramid or polyester material. Whereas, the composite ply 40 is precisely as earlier defined having a primary ply 40A extending from bead to bead and having inextensible cords 41 and an overlapping ply extension 40B having a synthetic cord 43 wrapping about the bead 26 and having a turnup end 32. Radially inward of the second ply reinforcing structure 38 is an elastomeric insert 42 interposed between an innerliner 35 and the ply 38. Between the ply 38 and the primary ply 40A of the composite ply 40 is an elastomeric insert 46. The cords 41 of the primary ply 40A are preferably inextensible and made of steel; whereas, the cords 43 of the ply extension 40B are preferably synthetic and made of a similar material to that of the second ply 38. The runflat tire has an unloaded and inflated section height of (SH). When normally inflated, but statically loaded, the tire deflects yielding a loaded height of about 75% or less of (SH). When the tire is uninflated and similarly statically loaded, the tires section height is 35% or greater of (SH). This class of tires generally have thicker sidewalls as shown in FIGS. 3, 4, 8 and 9. Such tires can employ a composite ply having inextensible cords 41 having filaments of a diameter from 0.05 to 0.5 mm, preferably 0.25 to 0.4 mm. Such cords 41 are preferably metallic, made of steel, but are not limited to very high tensile steel cords of pneumatic tires without runflat capability. This is made possible because the thickened sidewalls limit the flexure fatigue or bending fatigue of the cords 41 enabling more rigid cords to be employed. This has the advantage of increasing the tires load carrying capability while lowering the tires cost. This construction has many similarities to a co-pending application entitled "RUNFLAT TIRE WITH IMPROVED CARCASS", Ser. No. 08/865, 489 filed on May 29, 1997, which is incorporated in its entirety herein by reference. In that application, it was pointed out that the bending modulus of the sidewall structure could be moved to be substantially adjacent to the inextensible cords 41 of the ply structure 40. By attaching an overlapping synthetic cord 43 as a ply extension 40B, which wraps around the bead portion, the tire engineer is now able to tune or adjust the performance of the tire so that in the bead area 22 the substantially more compliant synthetic material is effectively wrapped around the beads providing for easier assembly and an ability to adjust the ride performance of the vehicle by raising or lowering the transition between extensible and inextensible ply cords. By doing that, the engineer is able to adjust the radial location of the overlap between the extensible and inextensible cords so that the tire can act more like a composite having primarily synthetic cords in the lower bead region or he can adjust the stiffness by lowering the inextensible cords to adjacent the bead area to increase the stiffness of the bead portion.

Figures 5, 5A:
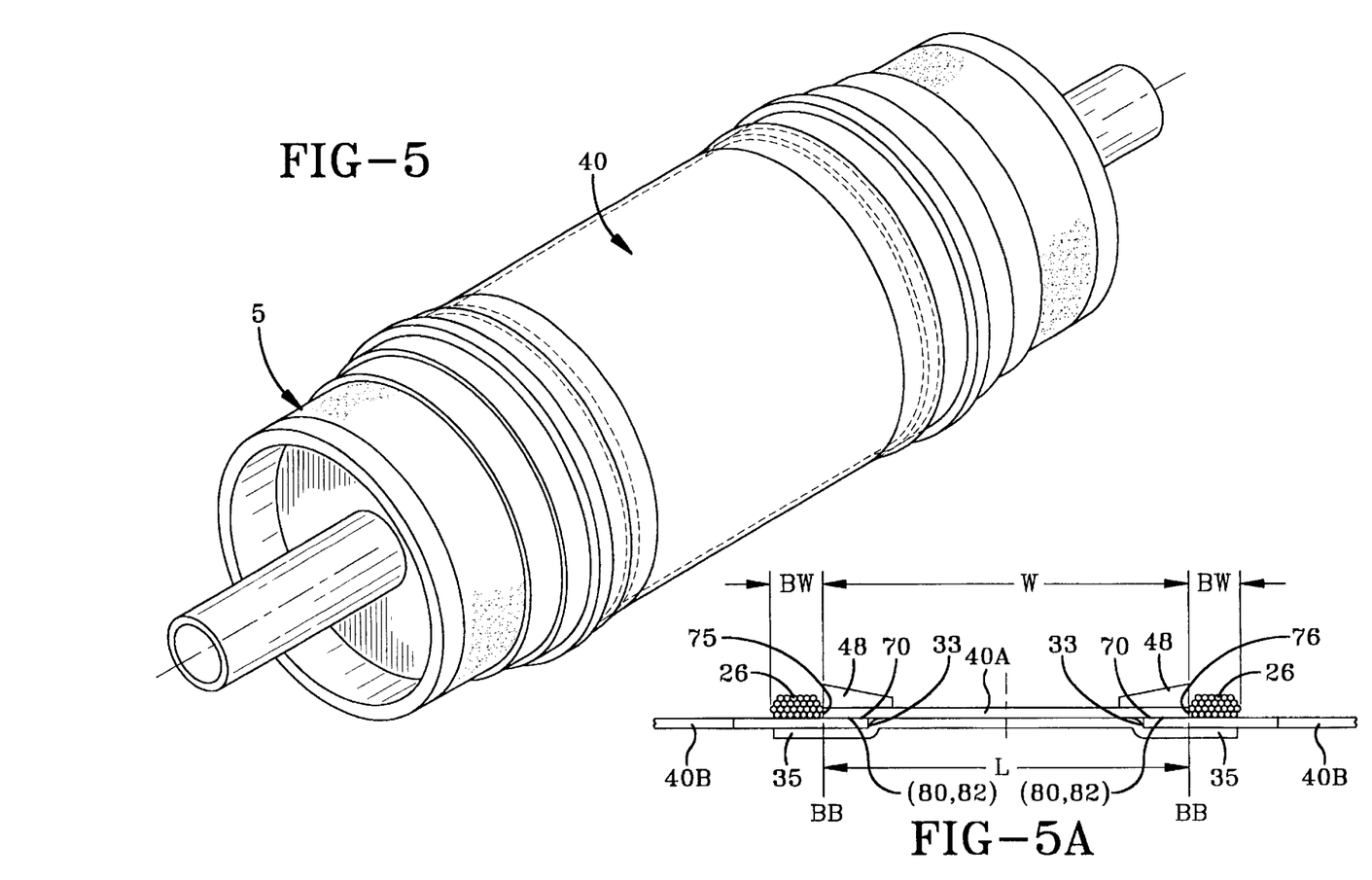
FIG. 5 is a perspective view of the composite ply shown on a building drum being fabricated employing a first method of assembly.
FIG. 5A is a cross-sectional view of the carcass made to the first method.

With reference to FIG. 5, there is shown a perspective view of the composite ply 40 shown on a building drum 5. The composite ply 40 has the ply extensions 40B pre-attached to the primary ply component 40A. The bead cores 26 are then placed over the ply extensions 40B to an area approximately axially adjacent the primary ply 40A on each side of the tire 10 as shown. As the tire carcass is inflated, the ply extensions 40B hold the primary ply 40A near the proximate location relative to the bead core 26. FIG. 5A shows the cross-sectional view of the features described above.

Figures 6, 6A:
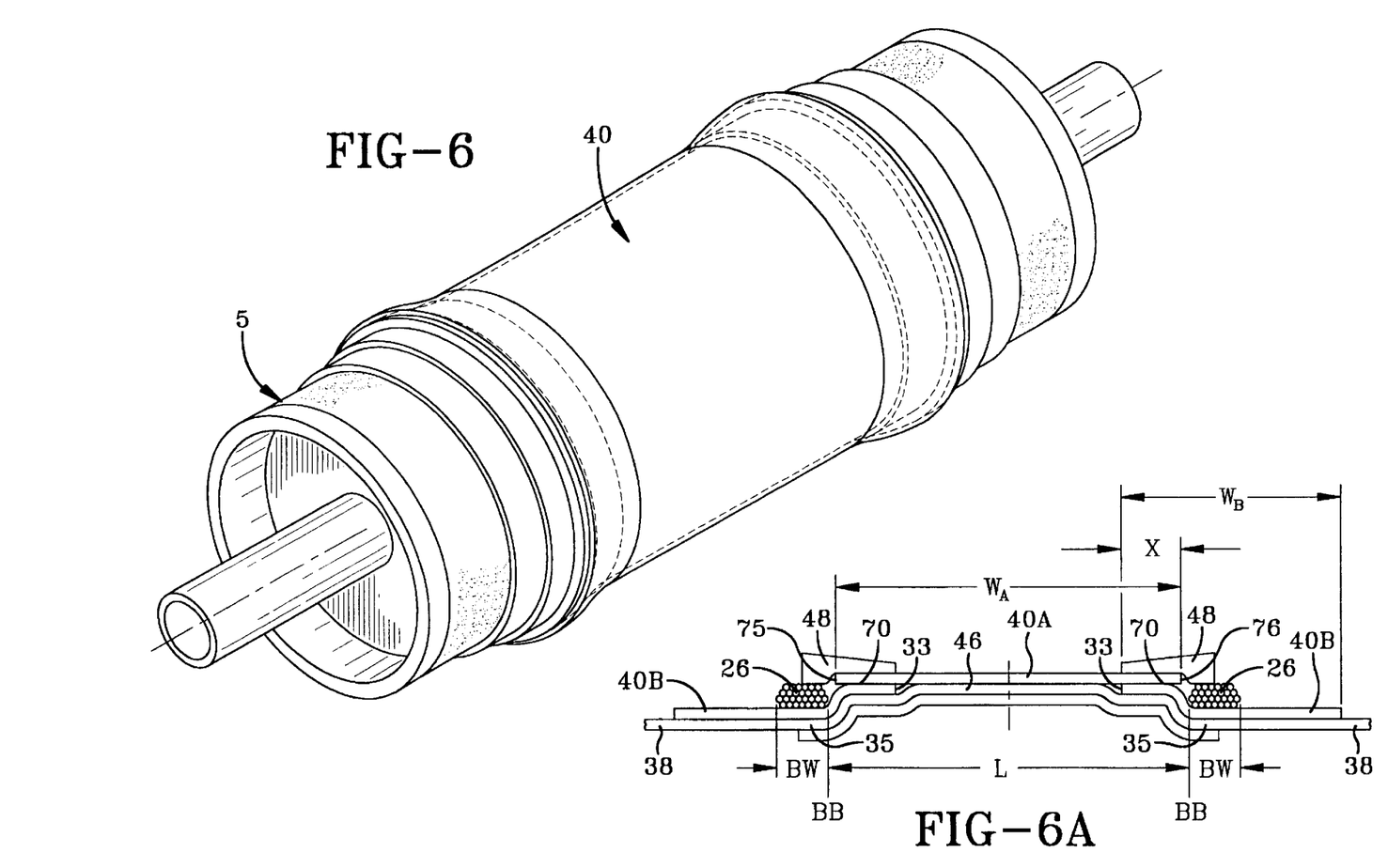
FIG. 6 is a perspective view of the composite ply shown being fabricated in a preferred alternative method.
FIG. 6A is a cross-sectional view of the carcass made to the preferred alternative method.

FIG. 6 is a perspective view of the composite ply 40 shown being fabricated.

As shown, the primary ply 40A has been cut to a predetermined width $W_A$. The width $W_A$ extends transversely across the primary ply 40A from a first end 75 to a second end 76 substantially perpendicular to the longitudinal length of the primary ply 40A. In one preferred embodiment, the ends 75, 76 are spaced to lie adjacent to but inward of the bead cores 26 when the ply 40 is applied to a tire building drum 5.

The ply extensions 40B preferably overlap the ends 75, 76 a minimum distance of 1 cm.

The ply extensions 40B may be joined to be radially below or inward of the primary ply 40A. In such a case, the first ends 75 and second ends 76 of the primary ply 40A are interposed between the bead cores 26 or apex filler 48 and the ply extensions 40B. Alternatively, the ply extensions 40B can lie radially above the primary ply 40A such that the first ends 75 and second ends 76 lie radially inward of the ply extensions 40B.

An important feature of the present invention is that the adjoining joint surfaces 70 of the ply extension 40B and the primary ply 40A in the region of the joint overlay should be at least surface precured. This at least surface precuring locally in the joint 70 area of the overlapping portions insures that the ends 75, 76 of the primary ply 40A remain securely fixed at a known location relative to the bead cores 26. It has been determined that when the surfaces at the joint interface 70 are unvulcanized, they will slip during the molding process. As the rubber softens and begins to liquefy during molding, the joint 70 looses its ability to hold the ply ends 75, 76.

Typically, one end 75 or 76 will soften and slip before the other end. Once the slippage occurs, the cord tension of the tire is relaxed. Accordingly, the other side has no tension to force an equal slippage. The net result is the end 75 may be higher or lower than the end 76 and the distance between ends 75 and 33 is not equal to the distance between ends 76 and 33. This. changes the tire's performance and handling characteristics in a random and less than predictable manner. This type of cord path slippage is commonly referred to as a "non-uniformity". Generally speaking, non-uniformities are preferably avoided.

The present invention solves the problem of cord slippage in a unique manner. The adjoining and overlapping surfaces at the joint 70 are at least surface precured. This locks the ply cords 41, 43 together at their respective ends 33, 75, 76 so that slippage of cords 41 relative to a ply extension cords 43 is eliminated. This insures that when the tire is built on a building drum, the bead cores 26 and the drum 5 secure the location of the ply path between the bead cores 26. Thus, when the tire 10 is toroidally-shaped, the ply path is fixed without a slippage of the joint 70. Since the joint 70 does not slip, the ends 75, 76 remain equally spaced above the bead cores 26. In the present application, the primary ply cords 41 are substantially inextensible while the cords 43 of the ply extension 40B are flexible and substantially extensible relative to the primary ply cords 41. This feature coupled with the cured joints 70 insures that the tension in the cords 41 is transferred to the ply extensions 40B equally on each side of the tire 10. This means that all stretching occurs in the ply extension cords 43 generally equally. This feature enables the tire 10 to be manufactured repeatedly and uniformly in mass production.

In one method of surface precuring the joint 70, the steps of locally curing the joint 70 is accomplished by applying an adhesive 80 to the adjoining surfaces. Once coated with the adhesive, the joint is heated curing the mating surfaces. Care is taken to limit the curing of the ply 40 to the area occupying the overlapping portions of the joints 70 leaving the remaining rubber surfaces unvulcanized.

Preferably, the adhesive 80 may have induction-sensitive material 82 included in the formulation. Thus, when the joints 70 treated with the adhesive 80 are exposed to an induction heating energy field, the sensitive material 82 is activated giving rise to rapid heating and curing of the surfaces of the joint 70, the induction coil not illustrated.

Once cured or heat activated, the joints 70 are forced together creating a cured joint 70. The forcing together is commonly referred to as "stitching".

The ply extensions 40B, when applied to the primary ply 40A, are presumed to have predetermined width ($W_B$). The overlapping of the primary ply 40A and the two ply extensions 40B yield a composite ply 40 having a total width of $W_T = W_A + 2W_B - 2X$ where X equals the width of the overlap at each joint 70. The total width $W_T$ of the composite ply structure 40 includes the distance between the bead cores 26 and the two ply turnups 32.

It is accordingly appreciated that the tire engineer can vary the location of the ends 75, 76 to tune the tire's performance.

Another equally important tire tuning feature is the ability to select optimal cord angles of the ply extensions 40B to enhance handling. Thus, bias-angled cords 43 in the ply extensions 40B can create improved tire handling.

As can be seen from both FIGS. 5 and 6, the resulting constructions are fundamentally the same as the method employed in FIG. 6 both methods providing the ability to lower the ends 75, 76 the primary ply component 40A to a location close to the bead cores 26 during the inflation blow-up forming of the finished tire.

It is understood by those of ordinary skill in the art that the method of forming the tire as shown in FIGS. 5 or 6 can be employed on the inventive tire FIGS. 1 and 2 or alternatively the runflattire FIGS. 3 and 4 without significant modification.

Figure 8:
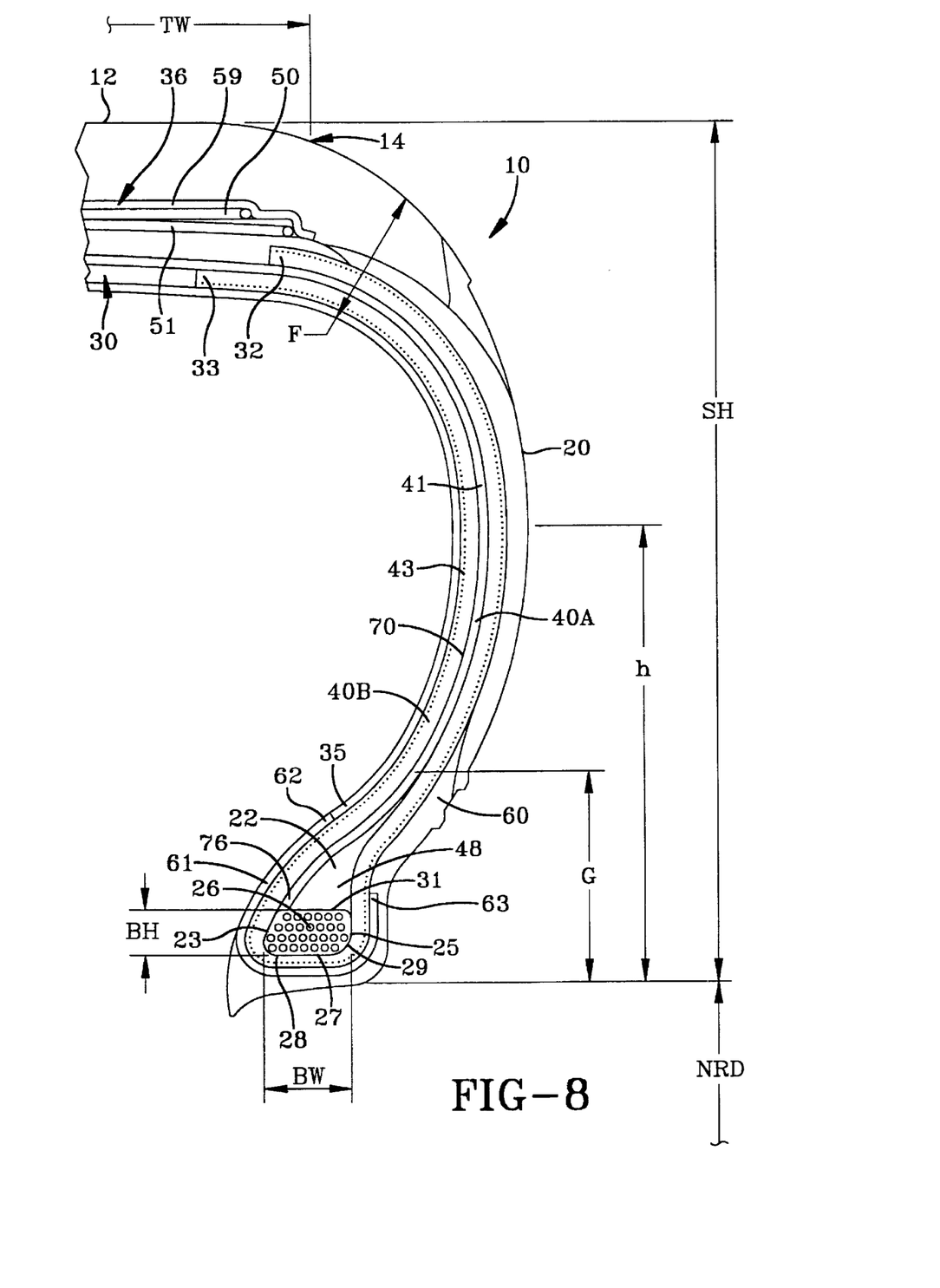
FIG. 8 is a cross-sectional view of a second alternative embodiment runflat tire.
Figure 9:
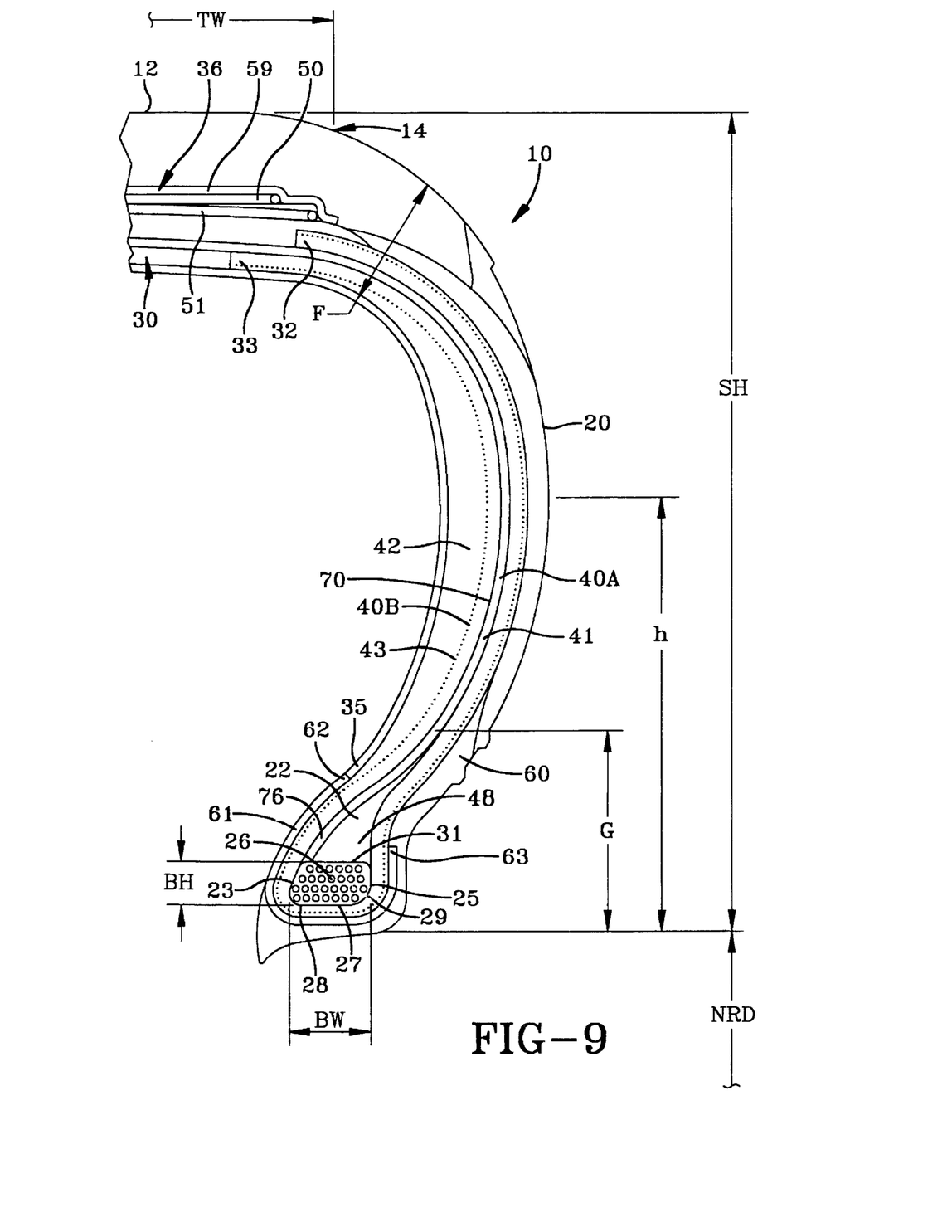
FIG. 9 is a cross-sectional view of a third alternative embodiment runflat tire.

With reference to FIGS. 8 and 9 cross-sectional views of a second and third alternative embodiment tires 10 are shown. In the second embodiment tire 10, the ply extension 40B of the composite ply 40 is fabricated in a unique manner. As shown, both the radially inner end 33 and the radially outer end 32 of the ply extension 40B extend a distance approximately under the belt reinforcing structure 36. The ply extension 401 as shown has a predetermined cross-sectional thickness (T), the ply cords 43 are placed adjacent one surface as opposed to the opposite surface resulting in a asymmetric location of the cords 43 such that a large amount of elastomeric material is on one side of the cords 43 with virtually none on the opposite side of the cords 43.

During the fabrication of this tire, the ply extensions 40B are laid on the building drum and extend substantially wider on either side of the bead core 26. The width is sufficient so that as the tire is inflated, the ends 32 will terminate under the belts 50, 51. The primary ply 40A is laid between the bead cores 26 as shown and the overlapping joint 70 is precured by preferably activating an induction heating coil locally to create an induction field between ends 45, 46 and ends 33. Alternatively, the composite ply 40 can be brought to the building drum 5 with the ply extensions 40B already precured to the primary ply 40A As the tire 10 is inflated and the ply extension 40B is turned up, the tire cross-section results as shown in FIG. 8. Preferably, the elastomeric ply coat for the ply extension 40B is similar in composition to the insert fillers 42, 46 previously discussed. As the ply extension 40B turns up, it forms two insert fillers material and apex filler from the thickened area of the ply coat. The primary ply 40A is sandwiched and interposed between both ends 32, 33 of the radially extending ply extension 40B, the resultant tire is a runflat tire wherein the apex filler and inserts were cleverly replaced by being incorporated into the ply extension 40B. As can be easily appreciated by those of ordinary skill in the art, this tire greatly reduces the number of components used in the manufacture and assembly of a runflat tire greatly improving both the speed and accuracy at which the tire can be manufactured. The cords 41 of the primary ply preferably are inextensible but could be any of the cord materials described including nylon, rayon, polyester, etc.

If a higher effective tire spring rate is needed the tire of FIG. 8 may further include inserts 42 located radially inward and adjacent to the ply extension 40B as shown in FIG. 9. This third alternative embodiment runflat tire has a great load carrying capacity at O inflation pressure.

Figure 7A:
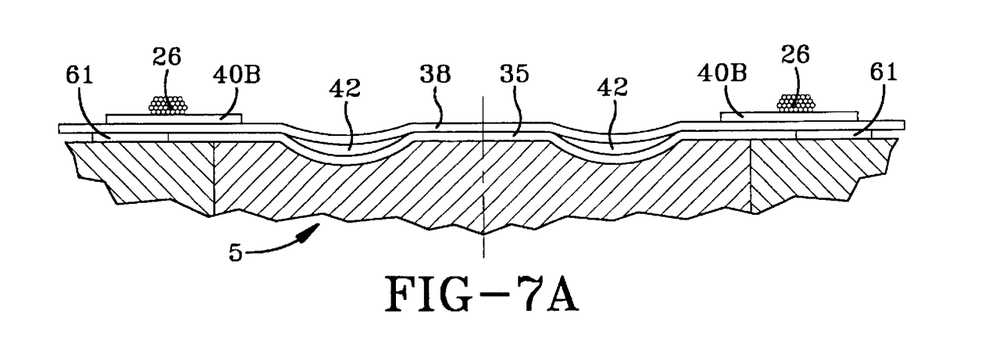
FIGS. 7A, 7B, and 7C are schematic views of the runflat tire carcass of FIG. 4 being made according to the method of FIG. 6.
Figure 7B:
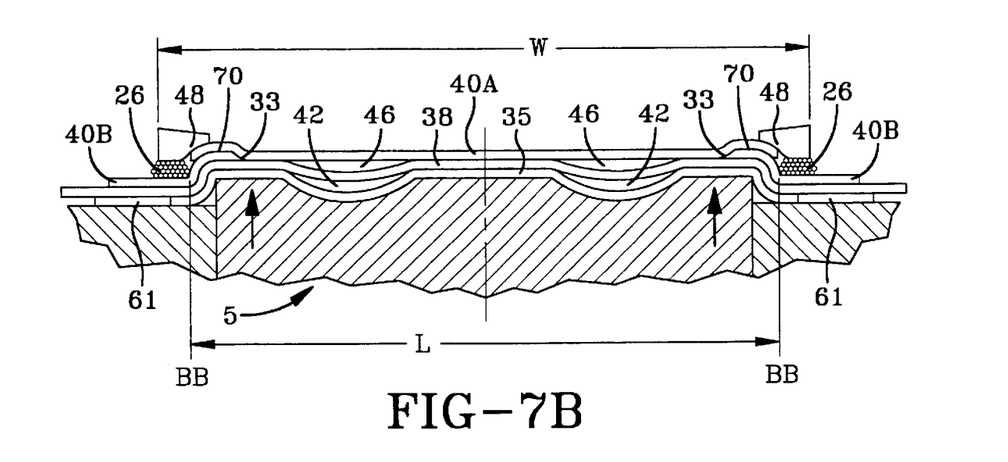
Figure 7C:
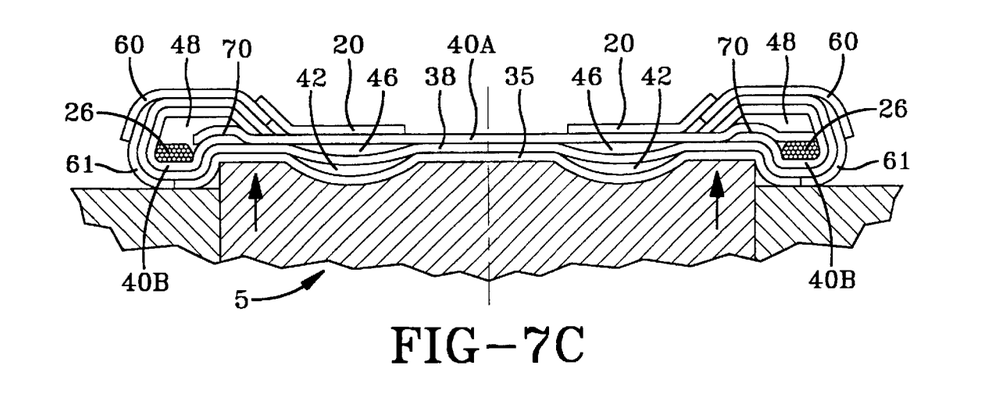

When assembling the runflat tire of FIG. 4 with a composite ply 40, the preferred method includes the steps of providing a building drum 5 having a contoured profile as shown in the cross-sectional view of FIGS. 7A, 7B and 7C applying the liner 35, a toe guard of fabric material (optionally), the first inserts 42 and the ply 38 with synthetic cords overlaying the previously mentioned components. Then the composite ply 40 with the primary ply 40A precured to the ply extensions 40B at the joint interfaces 70 is placed over the ply 38 approximately centered at the planes (B—B), the planes (B—B) being the planes defining the spacing (L) between the bead cores 26. Then one bead core 26 is placed at each plan (B—B). It is important to note that the bead cores 26 can slide over the carcass structure without impediment because of the drum contours and the sufficiently large inside diameter of the bead cores 26. This means the cores 26 can freely be slide over the entire structure from either end of the building drum or the beads 26 can be installed from both ends, if desired.

When the beads 26 are installed, the crown drum expands setting the beads location. The insert fillers 46 are then applied. It is important to note that the primary ply 40A has a width $W_A$ about equal to the bead core spacing (L), then the apex fillers 48 are attached preferably directly over the ends 45, 46 of the primary ply 40A The carcass then has the turnups 34 of the ply 38 and 32 of the extension 40B folded up and stitched to the carcass. Then belt wedge gums strips and the chafer and sidewall components 60, 20 are attached. The carcass is then inflated to a toroidal shape and as the tire 10 is being shaped, the primary ply 40A rotates adjacent the bead cores 26 to the axially inner location of the bead cores 26 contiguously fixed at the precured joint 70 to the ply extensions 40B as previously discussed. Then the belt layers 50, 51 and the overlay 59 (if used) is applied as well as the tread 12, thus completing the assembly of the green tire 10.

In the preferred embodiment tire 10 of FIGS. 3 and 4, the overlay 59 is wound spirally over the belts in three layers to enhance the stiffness of the tread when the tire is operated in the runflat condition.

It will be appreciated by those of ordinary skill in the art the chafing of the tires as shown in the lower bead region radially outward of the carcass structure 30 adjacent the rim flange may be minimized, especially during the use in uninflated condition by providing a hard rubber chafer portion 60. Furthermore, it is appreciated by those of ordinary skill in the art that high-speed performance of the tires shown can be enhanced by the addition of fabric overlays 59, including, but not limited to, nylon or aramid overlays either in fabric plies or in strips.

What is claimed is:

1. The method of preforming a composite ply (40) and forming a tire with said composite ply, the composite ply (40) having a primary ply (40A) and a pair of ply extensions (40B) for use in the carcass of the tire (10), the method comprising the steps of:

cutting to a predetermined width ($W_A$) primary ply (40A) reinforced with parallel substantially inextensible cords (41) encapsulated in unvulcanized rubber (44), the width ($W_A$) extending between a first end (75) and a second end (76);

applying a pair of ply extensions (40B) of predetermined widths ($W_B$), one ply extension (40B) being overlappingly joined to a first end (75) and one ply extension (40B) being overlappingly joined to a second end (76), each ply extension (40B) being reinforced with substantially extensible parallel cords (43) encapsulated in unvulcanized rubber (44);

precuring the overlappingly joined ply extensions (40B) to the primary ply (40A) locally along the adjoining overlapping joint surfaces (70) thereby forming a composite ply (40) having a predetermined total width ($W_T$), the composite ply being unvulcanized except at the overlapping joints (70);

assembling the preformed composite ply (40) into a tire;

curing the tire wherein the tension in the cords (41) is transferred to the ply extension (40B) equally on each side of the tire (10), all stretching occurring in the ply extension cords (43) substantially equally.

2. The method of preforming a composite ply (40) of claim 1 further comprising the steps of:

applying an adhesive coating (80) to the adjoining overlapping joint surfaces (70) prior to curing the joint (70).

3. The method of preforming a composite ply (40) of claim 2 wherein the adhesive coating (80) includes induction heat sensitive material (82).

4. The method of preforming a composite ply (40) of claim 3 further comprising the steps of:

activating an induction field of energy along the overlapping joints (70), thereby heating the adhesive (80) sufficient to at least surface precue the joints (70).

5. The method of preforming a composite ply (40) of claim 4 further comprising:

applying force to the induction heated joints (70), thereby stitching the joint (70).

* * * * *